(12) United States Patent  (10) Patent No.: US 8,284,549 B2
Liu  (45) Date of Patent: Oct. 9, 2012

(54) INVERTED U FRAME WITH PIVOTAL MICRO-PROJECTOR AND CAMERA FOR RELEASABLY SECURING TO LAPTOP OR KEYBOARD

(75) Inventor: Yung-Lung Liu, Taichung Hsien (TW)

(73) Assignee: Sunrex Technology Corp., Taichung (TW)

( * ) Notice: Subject to any disclaimer, the term of this patent is extended or adjusted under 35 U.S.C. 154(b) by 264 days.

(21) Appl. No.: 12/785,992

(22) Filed: May 24, 2010

(65) Prior Publication Data

US 2011/0286170 A1   Nov. 24, 2011

(51) Int. Cl.
*G06F 1/16* (2006.01)
*E05D 11/10* (2006.01)
*E05C 17/64* (2006.01)

(52) U.S. Cl. ......... 361/679.23; 361/679.21; 361/679.26; 16/334; 16/342

(58) Field of Classification Search ........... 361/679.01–679.45, 679.55–679.59; 16/334, 342
See application file for complete search history.

(56) References Cited

U.S. PATENT DOCUMENTS

| 5,235,495 | A  | * | 8/1993  | Blair et al. ............... 361/679.26 |
| 7,156,351 | B2 | * | 1/2007  | Wang et al. ................... 248/121 |
| 2005/0132536 | A1 | * | 6/2005 | Hashizume .................... 16/386 |
| 2009/0033785 | A1 | * | 2/2009 | Fujinawa et al. ........ 348/333.01 |
| 2009/0290298 | A1 | * | 11/2009 | Hsieh et al. .............. 361/679.27 |
| 2009/0322967 | A1 | * | 12/2009 | Liou et al. ..................... 348/744 |

* cited by examiner

*Primary Examiner* — Jayprakash N Gandhi
*Assistant Examiner* — Nidhi Desai (57) ABSTRACT

An inverted U-shaped frame includes a coupling at either end of the inverted U-shaped frame for pivotably securing to front corners of an electronic device (e.g., laptop or computer keyboard); a micro-projector pivotably mounted on a transverse part of the inverted U-shaped frame; and a camera pivotably mounted on the transverse part of the inverted U-shaped frame besides the micro-projector.

3 Claims, 10 Drawing Sheets

INVERTED U FRAME WITH PIVOTAL MICRO-PROJECTOR AND CAMERA FOR RELEASABLY SECURING TO LAPTOP OR KEYBOARD

BACKGROUND OF THE INVENTION

1. Field of Invention

The invention relates to computer parts and more particularly to an Inverted U-shaped frame having pivotal micro-projector and camera, the inverted U-shaped frame being adapted to releasably secure to two top front corners of a laptop or a computer keyboard.

2. Description of Related Art

Projector and personal computer (PC) are often required in a meeting or briefing nowadays. An individual may feel inconvenient if no projector is available if such need arises. A typical keyboard has a plurality of keys for data input or instruction input. The individual may key in what is shown on a screen hanged on a wall when a meeting or briefing is being held.

A type of laptop having a micro-projector is commercially available. The micro-projector is pivotably mounted on a top edge of a display of the laptop. It has the advantages of being used as a typical projector if such need arises in a meeting or briefing.

However, the addition of the micro-projector inevitably further increases the manufacturing cost since other components (e.g., motherboard, CPU, DVD, etc.) have already increased the cost of a typical laptop. Moreover, the addition of the micro-projector can consume energy greatly and increase weight. In addition, the pivotal display can block the sight when viewing the screen. Furthermore, the micro-projector is high in cost and low in resolution.

Moreover, as far as the present inventor is aware, there are no documents disclosing an Inverted U-shaped frame having pivotal micro-projector and camera, the inverted U-shaped frame being adapted to releasably secure to two top front corners of a laptop or a computer keyboard. Thus, the need for improvement still exists.

SUMMARY OF THE INVENTION

It is therefore one object of the invention to provide an inverted U-shaped frame comprising a coupling at either end of the inverted U-shaped frame for pivotably securing to front corners of an electronic device; a micro-projector pivotably mounted on a transverse part of the inverted U-shaped frame; and a camera pivotably mounted on the transverse part of the inverted U-shaped frame besides the micro-projector.

In a first aspect of the invention the electronic device is a laptop comprising a joint at either one of two front corners, the joint including a cylindrical aperture having a toothed inner surface and an axial conductive shaft, and wherein the couplings are adapted to pivotably secure to the joints by inserting the projections into the apertures with the holes fitted on the shafts and the toothed outer surfaces being in pivotal tooth engagement with the toothed inner surfaces so that an electrical connection from the laptop to both the micro-projector and the camera and a signal communication between the laptop and each of the micro-projector and the camera are carried out.

In a second aspect of the invention the micro-projector comprises an image processing unit for processing images, an imaged image memory electrically connected to the image processing unit for storing the images sent therefrom or sending the images to the image processing unit, an imaging unit for imaging the images, a zoom lens drive unit, a laser light source for emitting collimated laser light with the images sent from the image processing unit being projected, a projection optical system for receiving the laser light and projecting the images contained therein onto a display of the laptop as instructed by the zoom lens drive unit, a bus electrically connected to the image processing unit, the imaging unit, and the zoom lens drive unit, and a microprocessor electrically connected to the bus for controlling operations of the image processing unit, the imaging unit, and the zoom lens drive unit.

In a third aspect of the invention the camera comprises an optical system for taking pictures, an image sensor for sensing the pictures taken by the optical system, an ADC (analog to digital converter) for converting analog signals of the pictures into digital signals, an image formation for transforming the digital signals into images, a ROM (read-only memory) for storing software programs required for activating the camera, a work memory for temporarily storing the images, and a microprocessor electrically connected to the image sensor, the ADC, and the ROM for controlling their operations and being capable of instructing the work memory to send the images stored therein to the display for showing.

The above and other objects, features and advantages of the invention will become apparent from the following detailed description taken with the accompanying drawings.

DETAILED DESCRIPTION OF THE INVENTION

Referring to FIGS. 1 to 9, an inverted U-shaped frame 2 has pivotal micro-projector 4 and camera 5 and is adapted to releasably secure to a laptop 1 in accordance with a first preferred embodiment of the invention comprises the following components as discussed in detail below.

Figure 2:
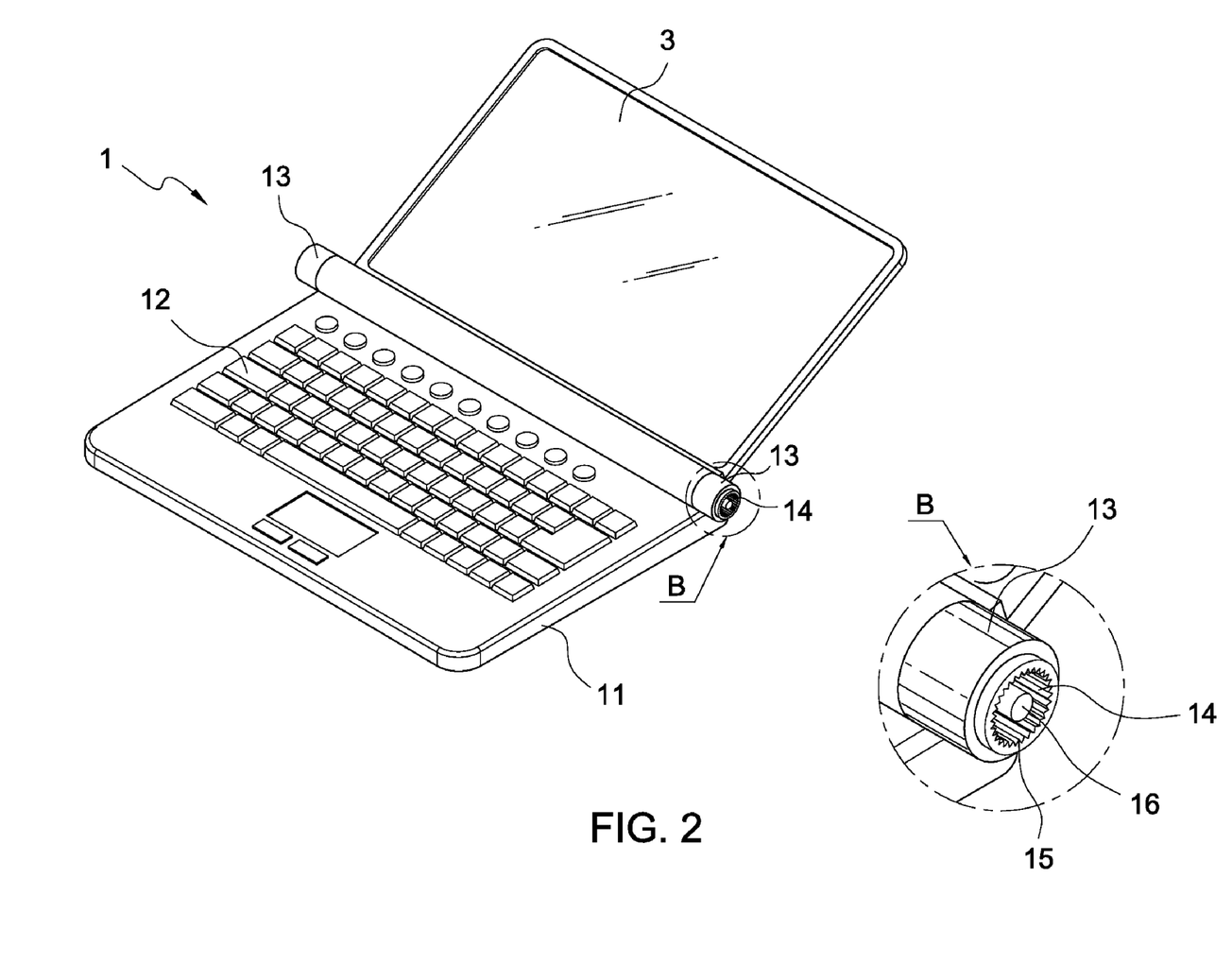
FIG. 2 is a perspective view of an open laptop having two front corners to be secured to the inverted U-shaped frame according to a first preferred embodiment of the invention.
Figure 3:
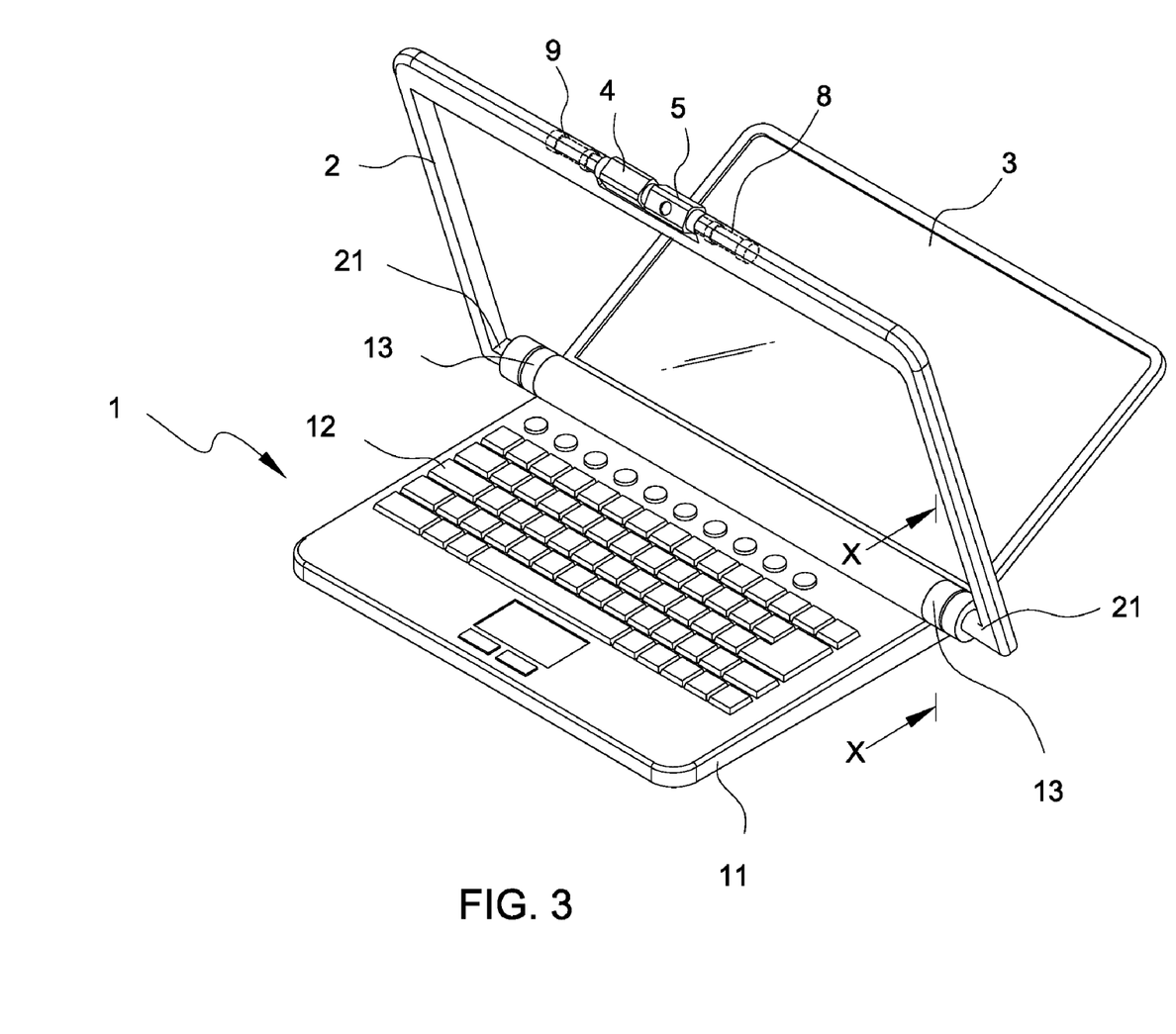
FIG. 3 is a perspective view of the assembled laptop and the inverted U-shaped frame.

The laptop 1 comprises a housing 11 provided with a keyboard 12 thereon, a rectangular display (e.g., liquid crystal display (LCD)) 3 pivotably secured to a front end of the housing 11, two cylindrical joints 13 at both front corners of the housing 11, and an inverted U-shaped frame 2 releasably, pivotably mounted at the joints 13 as detailed later. The display 3 is adapted to open an operating position or close onto the keyboard 12 in an inoperative position. The inverted U-shaped frame 2 is pivotal onto the keyboard 12 in the operating position or away from the keyboard 12 in the inoperative position in a manner known in the art.

Figure 1:
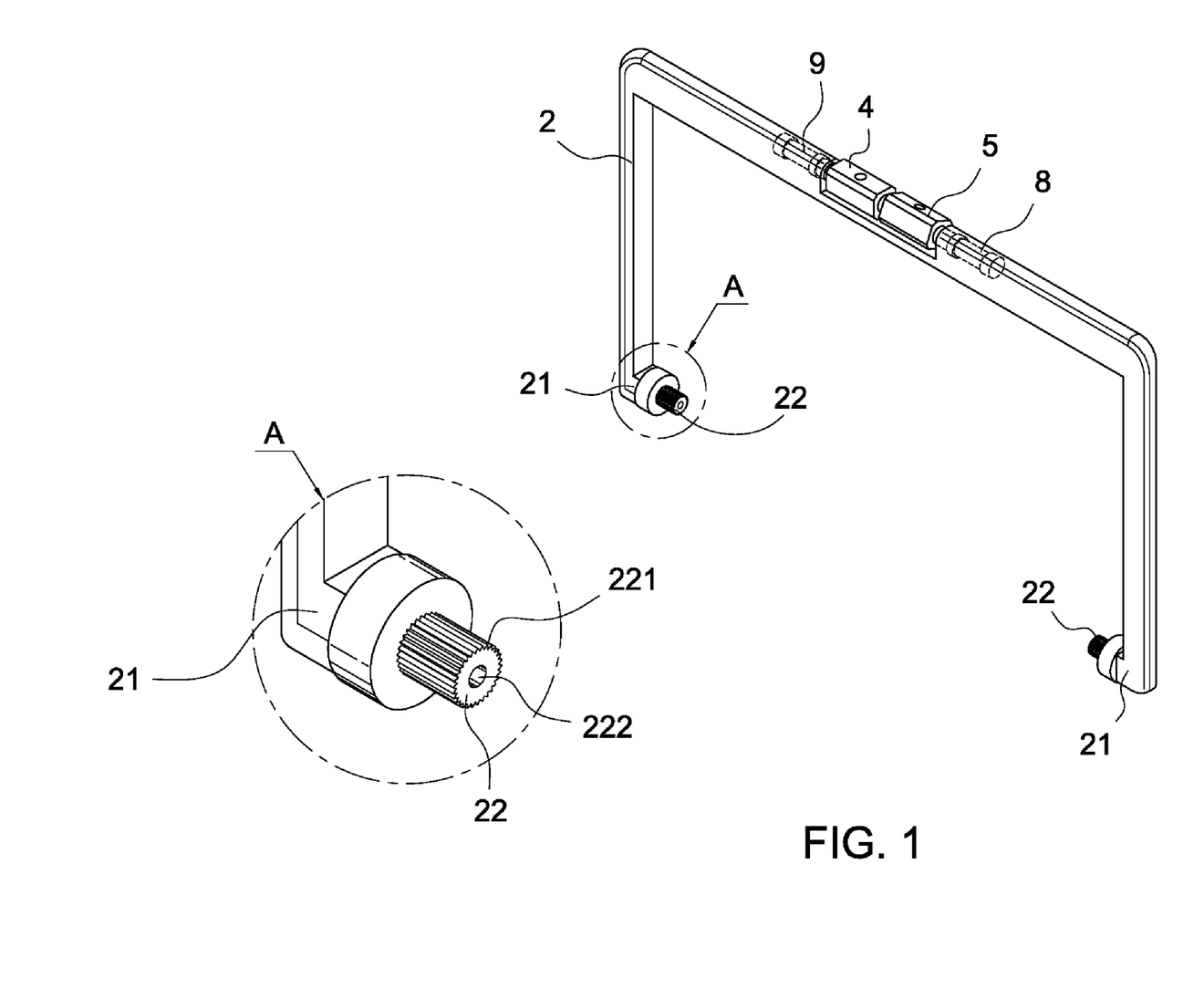
FIG. 1 is a perspective view of an inverted U-shaped frame having pivotal micro-projector and camera according to the invention.

The micro-projector 4 is pivotably mounted on a transverse part of the inverted U-shaped frame 2 by means of a pivot axis 9. Hence, the micro-projector 4 is adapted to adjust its projection angle. The camera (e.g., digital camera) 5 is pivotably mounted on the transverse part of the inverted U-shaped frame 2 besides the micro-projector 4 by means of a pivot axis 8. Hence, the camera 5 is adapted to adjust its picture taking angle.

Figure 8:
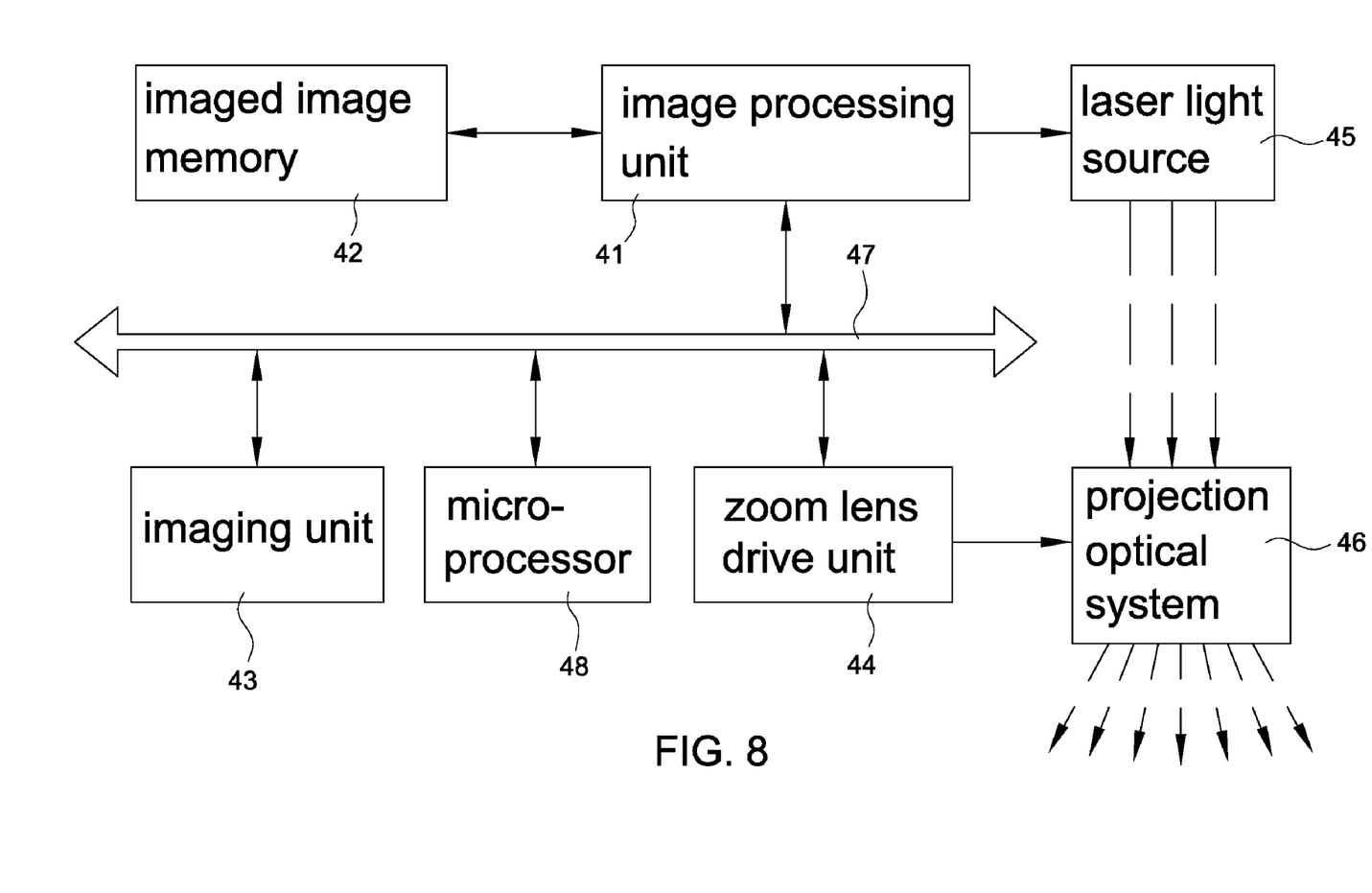
FIG. 8 is a block diagram of the micro-projector.

The micro-projector 4 is implemented as one employing LED (light emitting diode) based DLP (digital light processing), LCOS (liquid crystal on silicon), or laser based projection technology (see FIG. 8). Components (e.g., motherboard, keyboard, touchpad, hard disk, DVD, etc.) of the laptop 1 are known in the art. Therefore, their description is omitted herein for the sake of brevity. The micro-projector 4, the camera 5, the inverted U-shaped frame 2, and the front corners of the housing 11 are subjects of the invention which will be described in detail below.

The inverted U-shaped frame 2 is formed of thermoplastic and comprises a coupling 21 at either end. A hollow cylindrical projection 22 projects a short distance from one coupling 21 toward the other coupling 21. The projection 22 comprises a toothed outer surface 221 and an axial conductive hole 222 which is electrically connected to both the micro-projector 4 and the camera 5.

Figure 4:
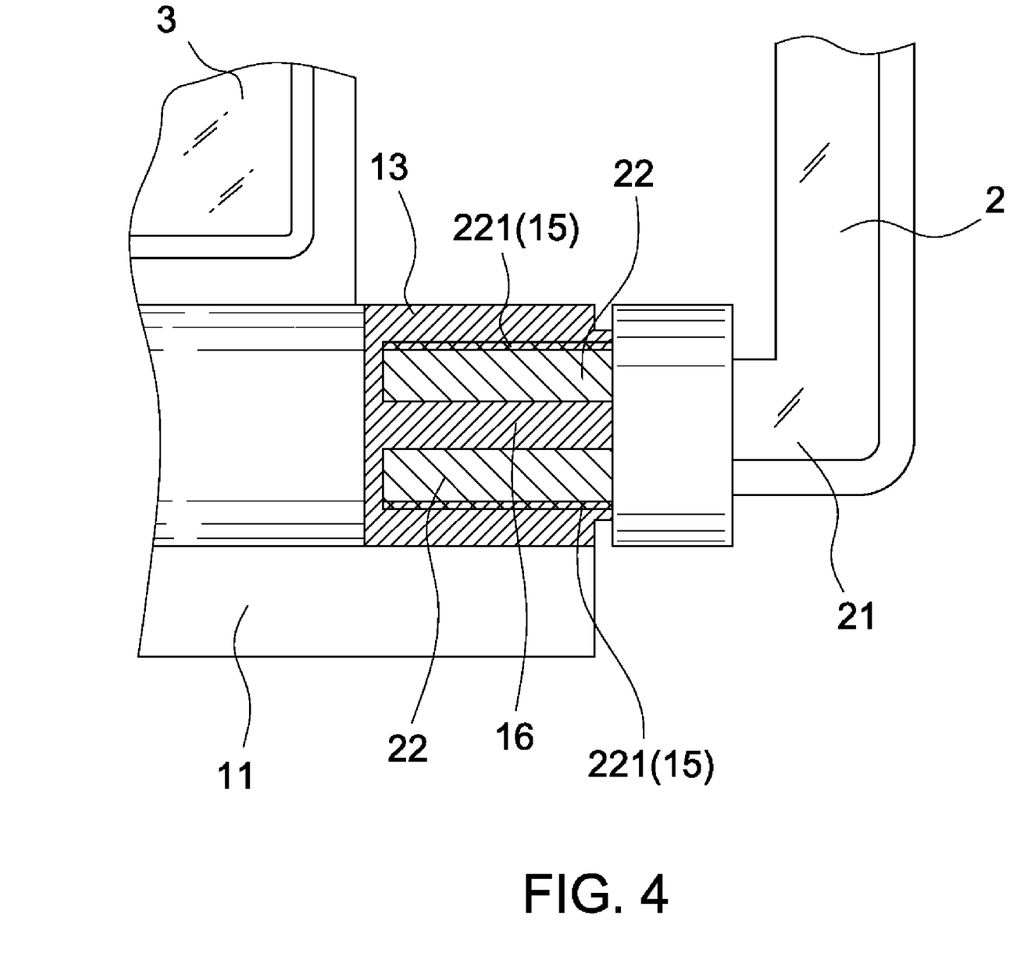
FIG. 4 is a longitudinal sectional view of the right coupling and adjacent components shown in FIG. 3.

Complementarily, a cylindrical aperture 14 is provided in either joint 13 and comprises a toothed inner surface 15 and an axial conductive shaft 16. Both the toothed inner surface 15 and the axial conductive shaft 16 are substantially flush with the mouth of the aperture 14. The coupling 21 is adapted to pivotably secure to the joint 13 by inserting the projection 22 into the aperture 14 with the hole 222 fitted on the shaft 16 (i.e., electrically connected together) and the toothed outer surface 221 being in tooth engagement with the toothed inner surface 15. Thus, electrical current and signals from the laptop 1 can be sent to both the micro-projector 4 and the camera 5 for their normal operations. A user may pivot the inverted U-shaped frame 2 by turning the flexible toothed outer surface 221 about the rigid toothed inner surface 15 in a tooth by tooth step. As a result, an angle of the inverted U-shaped frame 2 with respect to the housing 11 or the display 3 can be adjusted. Alternatively, electrical current and signal communication between both the micro-projector 4 and the camera 5 and the laptop 1 is through a USB (Universal Serial Bus) device.

As shown in FIG. 8, the micro-projector 4 comprises an image processing unit 41 for processing images, an imaged image memory 42 electrically connected to the image processing unit 41 for storing images sent therefrom or sending images to the image processing unit 41 as instructed, an imaging unit 43 for imaging the projected images, a zoom lens drive unit 44, a laser light source 45 for emitting highly collimated laser light with the images sent from the image processing unit 41 being projected, a projection optical system 46 for receiving the laser light and projecting the images contained therein onto a screen as instructed by the zoom lens drive unit 44, a bus 47 electrically connected to the image processing unit 41, the imaging unit 43, and the zoom lens drive unit 44, and a microprocessor 48 electrically connected to the bus 47 for controlling operations of the above parts. Laser based projection technology is adopted by the micro-projector 4. Hence, the micro-projector 4 has the advantages of less light loss, quality images and high brightness.

In one use mode such as in a meeting or briefing, a user may rotatably pivot the micro-projector 4 to adjust its projection angle in order to project what shown on the display 3 onto a screen 6 hanged on a wall. In detail, after turning on the laptop 1, the microprocessor 48 is activated to instruct the image processing unit 41 to retrieve images from the imaged image memory 42, instruct the imaging unit 43 to image via the image processing unit 41, instruct the laser light source 45 to emit collimated laser light, and activate the projection optical system 46 via the zoom lens drive unit 44. As a result, images are shown on the screen 6 by projecting (see FIG. 6). It is envisaged by the invention that quality images can be seen on the screen 6 by adjusting the projection angle of the micro-projector 4.

Figure 9:
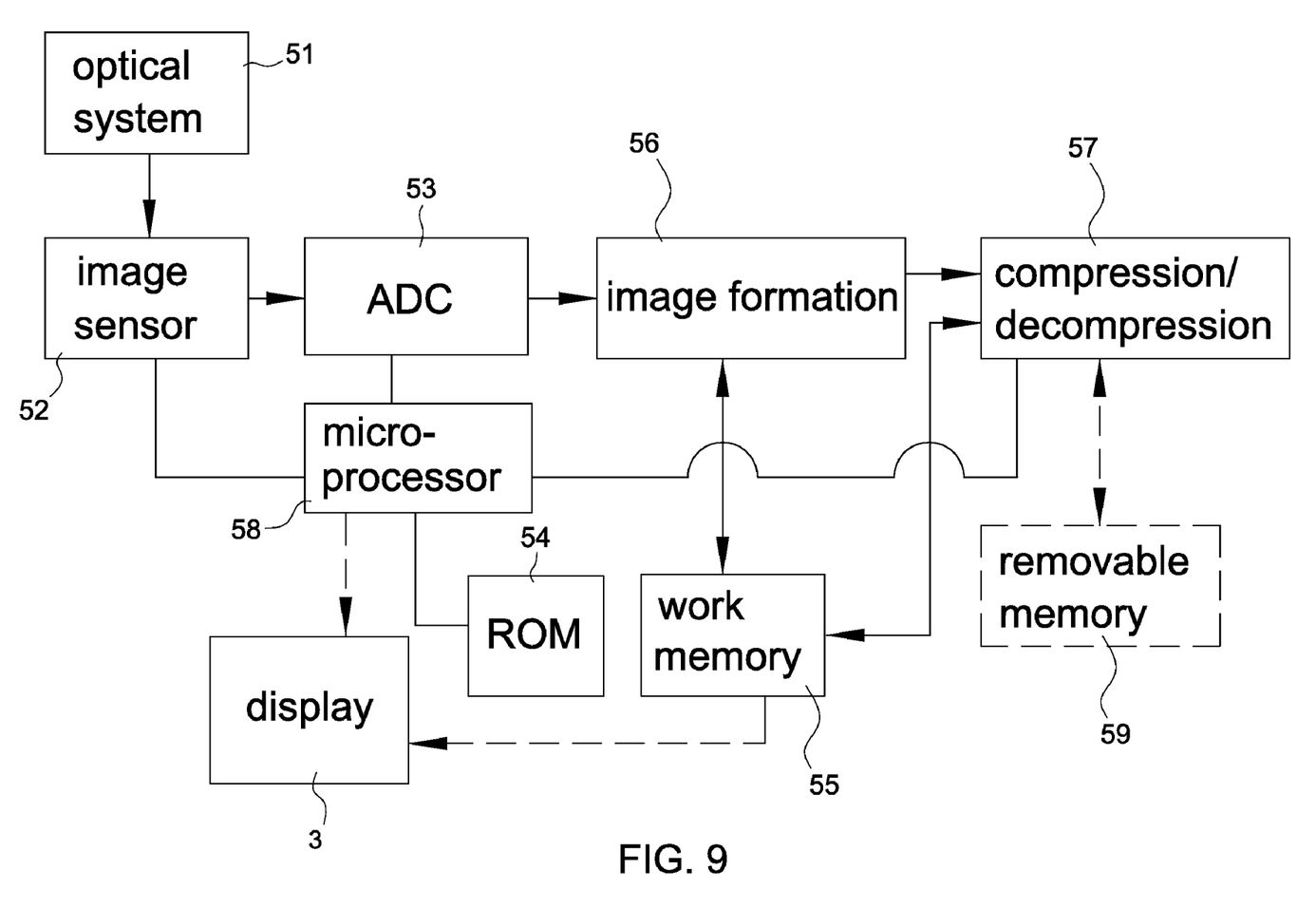
FIG. 9 is a block diagram of the camera.

As shown in FIG. 9, the camera 5 comprises an optical system 51 for taking pictures, an image sensor 52 for sensing pictures taken by the optical system 51, an ADC (analog to digital converter) 53 for converting analog signals of the pictures into digital signals, an image formation 56 for transforming the digital signals into images, a ROM (read-only memory) 54 for storing software programs required for activating the camera 5, a work memory 55 for temporarily storing the images, a compression/decompression 57 for compressing or decompressing the images so as to be further stored in a removable memory (e.g., USB stick) 59, and a microprocessor 58 electrically connected to the image sensor 52, the ADC 53, the compression/decompression 57, and the ROM 54 for controlling their operations. Further, the microprocessor 58 may instruct the compression/decompression 57 to send the images stored in the work memory 55 to the laptop 1 which in turn displays same on the display 3.

Figure 5:
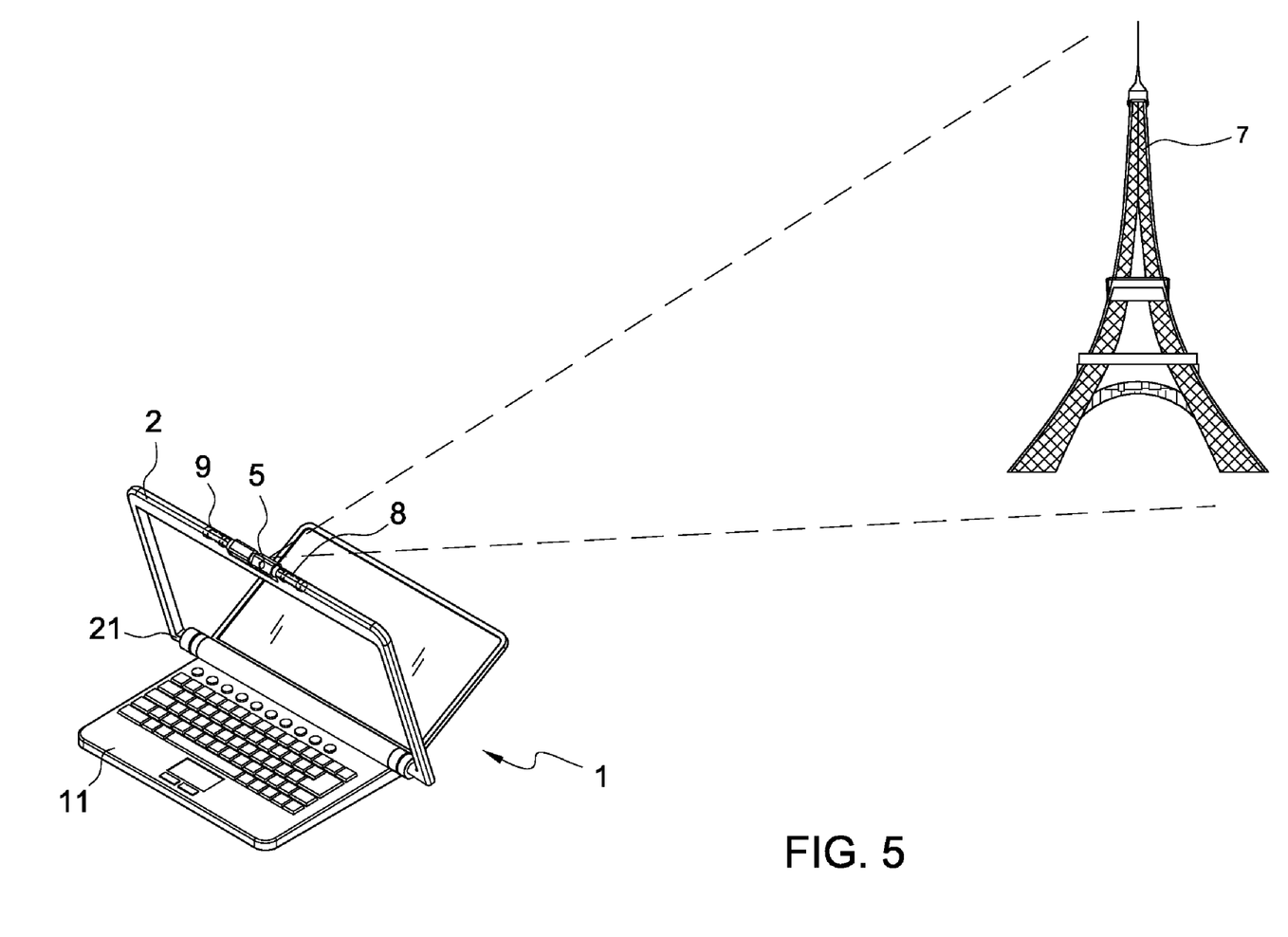
FIG. 5 is a perspective view showing an operation of the camera.
Figure 6:
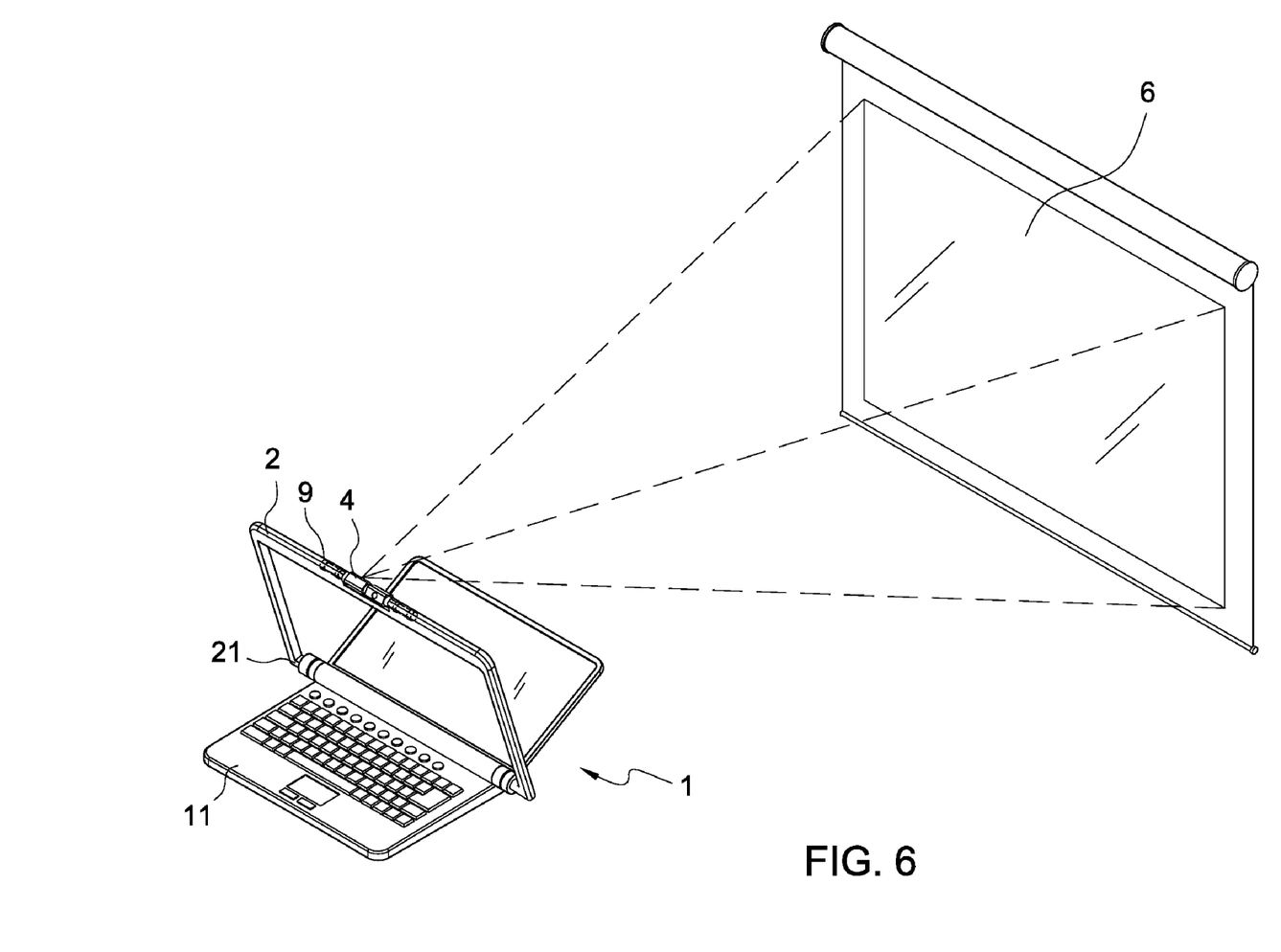
FIG. 6 is a perspective view showing an operation of the micro-projector.
Figure 7:
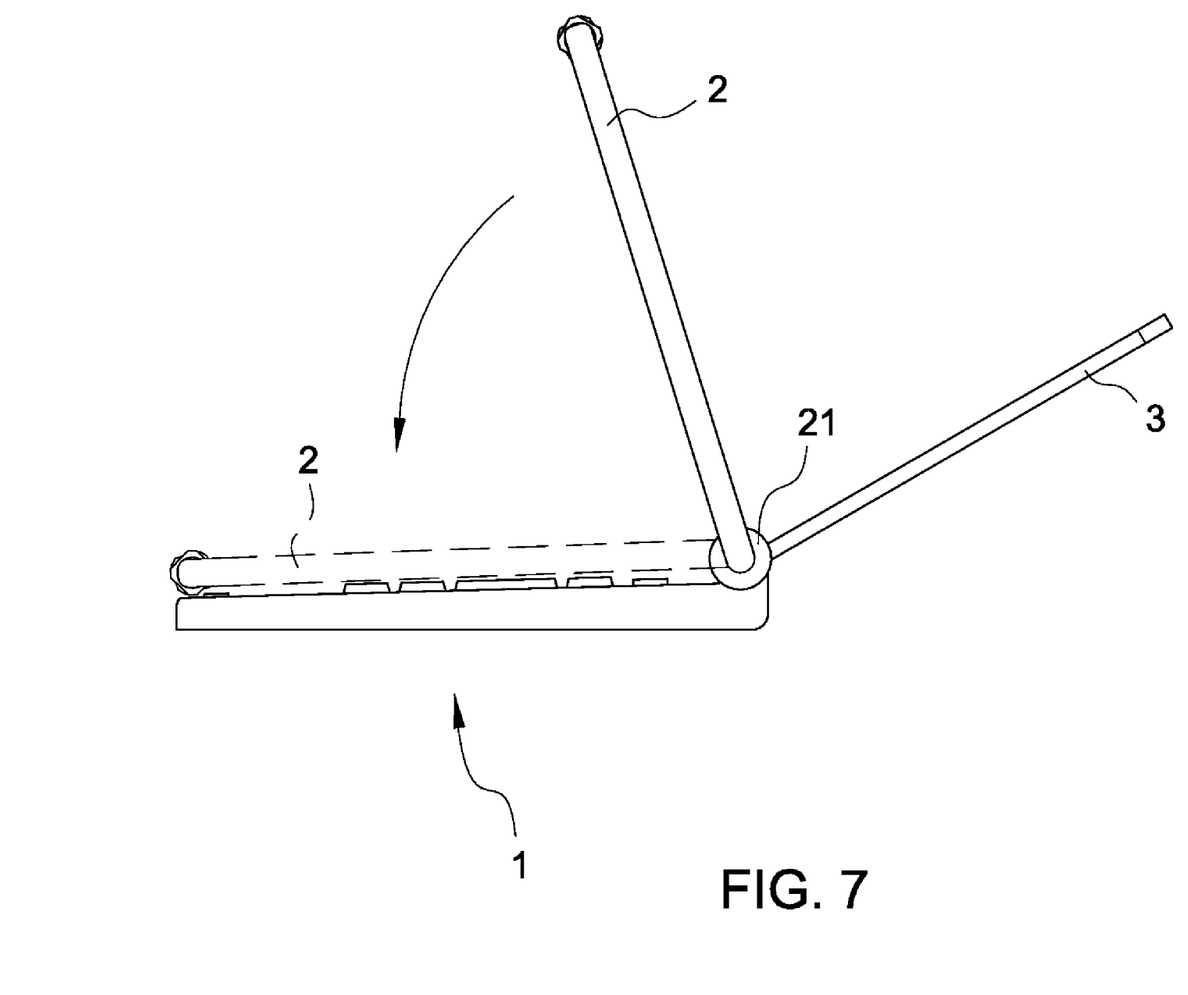
FIG. 7 is a side elevation of the laptop showing a pivotal operation of the display.

As shown in FIG. 5, after turning on the laptop 1, for taking a picture a user may operate the camera 5 (i.e., the optical system 51 as instructed by the microprocessor 58) to take a picture of an object 7. The taken picture is then sent to the ADC 53 to convert analog signals of the pictures into digital signals. Next, the image formation 56 transforms the digital signals into images. The work memory 55 may temporarily store the images. The compression/decompression 57 may compress or decompress the images sent from the image formation 56 and/or the work memory 55 so as to be further sent to the laptop 1 via the work memory 55. Finally, the laptop 1 sends the images to the display 3 for display. It is envisaged by the invention that quality images can be seen on the display 3 by adjusting the picture taking angle of the camera 5.

Figure 10:
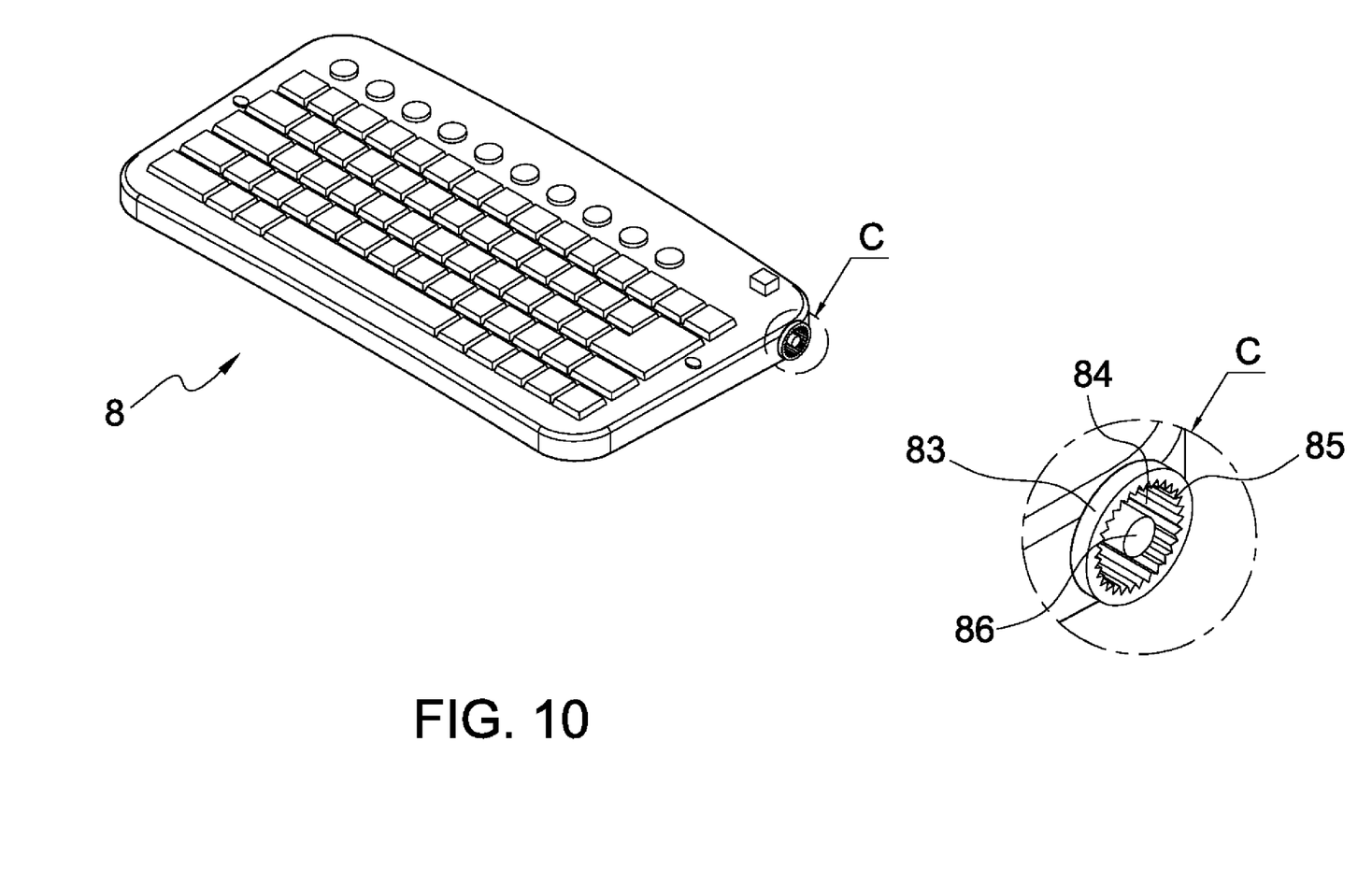
FIG. 10 is a perspective view of a keyboard having two front corners to be secured to the inverted U-shaped frame according to a second preferred embodiment of the invention.

Referring to FIG. 10, the inverted U-shaped frame 2 having pivotal the micro-projector 4 and the camera 5 is also adapted to releasably secure to a keyboard 8 in accordance with a second preferred embodiment of the invention. The characteristics of the second preferred embodiment are detailed below.

A cylindrical aperture 84 is provided in a projecting joint 83 at either front corner of the keyboard 8. The aperture 84 comprises a toothed inner surface 85 and an axial conductive shaft 86. Both the toothed inner surface 85 and the axial conductive shaft 86 are substantially flush with the mouth of the aperture 84.

Referring to FIG. 10 again in conjunction with FIG. 1, the couplings 21 are adapted to pivotably secure to the joints 83 by inserting the projection 22 into the aperture 84 with the hole 222 fitted on the shaft 86 (i.e., electrically connected together) and the toothed outer surface 221 being in tooth engagement with the toothed inner surface 85. Thus, electrical current and signals from a PC (not shown) can be sent to both the micro-projector 4 and the camera 5 via the keyboard 8 for their normal operations.

For the keyboard 8 being a wireless keyboard, wireless communication means such as Bluetooth, infrared (IR), or the like can be employed as well known in the art.

A user may pivot the inverted U-shaped frame 2 by turning the flexible toothed outer surface 221 about the rigid toothed inner surface 85 in a tooth by tooth step. As a result, an angle of the inverted U-shaped frame 2 with respect to the keyboard 8 can be adjusted. Alternatively, electrical current and signal communication between both the micro-projector 4 and the camera 5 and the keyboard 8 is through a USB device.

The invention has the following advantages: More options are provided for user selection. Power consumption is decreased greatly. Image quality is high.

While the invention herein disclosed has been described by means of specific embodiments, numerous modifications and variations could be made thereto by those skilled in the art without departing from the scope and spirit of the invention set forth in the claims.

What is claimed is:

1. An inverted U-shaped frame, comprising:

a coupling at either end of the inverted U-shaped frame for pivotably securing to front corners of an electronic device;

a micro-projector pivotably mounted on a transverse part of the inverted U-shaped frame; and a camera pivotably mounted on the transverse part of the inverted U-shaped frame besides the micro-projector;

wherein either coupling comprises a hollow cylindrical projection projecting toward the other coupling, the projection including a toothed outer surface and an axial conductive hole electrically connected to both the micro-projector and the camera; and wherein the electronic device is a laptop comprising a joint at either one of two front corners, the joint including a cylindrical aperture having a toothed inner surface and an axial conductive shaft, and wherein the couplings are adapted to pivotably secure to the joints by inserting the projections into the apertures with the holes fitted on the shafts and the toothed outer surfaces being in pivotal tooth engagement with the toothed inner surfaces so that an electrical connection from the laptop to both the micro-projector and the camera and a signal communication between the laptop and each of the micro-projector and the camera are carried out.

2. The Inverted U-shaped frame of claim 1, wherein the micro-projector comprises an image processing unit for processing images, an imaged image memory electrically connected to the image processing unit for storing the images sent therefrom or sending the images to the image processing unit, an imaging unit for imaging the images, a zoom lens drive unit, a laser light source for emitting collimated laser light with the images sent from the image processing unit being projected, a projection optical system for receiving the laser light and projecting the images contained therein onto a display of the laptop as instructed by the zoom lens drive unit, a bus electrically connected to the image processing unit, the imaging unit, and the zoom lens drive unit, and a microprocessor electrically connected to the bus for controlling operations of the image processing unit, the imaging unit, and the zoom lens drive unit.

3. The Inverted U-shaped frame of claim 1, wherein the electrical connection from the laptop to both the micro-projector and the camera and the signal communication between the laptop and each of the micro-projector and the camera are carried out by means of a USB (Universal Serial Bus) device.

* * * * *